(12) United States Patent
Kim

(10) Patent No.: US 6,704,363 B1
(45) Date of Patent: Mar. 9, 2004

(54) APPARATUS AND METHOD FOR CONCEALING ERROR IN MOVING PICTURE DECOMPRESSION SYSTEM

(75) Inventor: Eung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 09/586,593

(22) Filed: Jun. 2, 2000

(30) Foreign Application Priority Data

Jun. 2, 1999 (KR) ........................................ 1999-20276

(51) Int. Cl.[7] .............. H04B 1/66; G06K 9/36; H04N 7/12

(52) U.S. Cl. .............. 375/240.27; 382/252; 375/240.16; 348/402.1

(58) Field of Search .................. 375/240.27, 240.23, 375/240.01, 240.25, 240.26, 240.15, 240.16, 240.02; 340/425.2, 413.1, 416.1, 466; 382/252, 275, 236; 714/746; 358/433, 261.1

(56) References Cited

U.S. PATENT DOCUMENTS

| | | | | |
|---|---|---|---|---|
| 5,442,400 A | * | 8/1995 | Sun et al. | 375/240.15 |
| 6,026,506 A | * | 2/2000 | Anderson et al. | 375/240.26 |
| 6,560,282 B2 | * | 5/2003 | Tahara et al. | 375/240.02 |

FOREIGN PATENT DOCUMENTS

| | | |
|---|---|---|
| KR | 1998-51713 | 9/1998 |
| KR | 1998-53572 | 9/1998 |

* cited by examiner

*Primary Examiner*—Gims Philippe
(74) *Attorney, Agent, or Firm*—Birch, Stewart, Kolasch & Birch, LLP

(57) ABSTRACT

An apparatus and method for concealing error in moving picture decompression system is disclosed. The present invention predicts motion vectors of a damaged block from motion information of a previous block and an upper block adjacent to the damaged block when an error occurs, and compensate the damaged block. Therefore, the error concealment apparatus and method compensates for and maintains good picture quality at the receiving terminal against errors occurring in a channel.

18 Claims, 5 Drawing Sheets

FIG. 4

| | 49 | 47 | 45 | 43 | 32 | 21 | 10 | 0 |
|---|---|---|---|---|---|---|---|---|
| 0 | | mbt | mct | mvfs | mv_1_x | mv_1_y | mv_2_x | mv_2_y |
| 1 | | | | | | | | |
| 2 | | | | | | | | |
| 117 | | | | | | | | |
| 118 | | | | | | | | |
| 119 | | | | | | | | |

APPARATUS AND METHOD FOR CONCEALING ERROR IN MOVING PICTURE DECOMPRESSION SYSTEM

BACKGROUND OF THE INVENTION

1. Field of the Invention

The present invention generally relates to a moving picture compression and decompression system, and more particularly to an apparatus and method for concealing an error in a moving picture decompression system.

2. Description of the Related Art

Utilizing a digital signal processing technology, many systems have been proposed to compress and transmit a large amount of moving picture information through a transmission channel of a limited bandwidth. In moving picture standards such as MPEG, H.261 and H.263, re-synchronization due to channel errors is performed in units of a slice. Each slice consists of a plurality of macro blocks and each macro block is the unit for motion compensation decoding. A single frame generally includes many slices depending upon the size of an image. When an error is generated in such a slice, all information in the slice with the error is lost.

Also, moving picture coding methods use both a variable length coding and a motion compensation coding. In such case, an error in a bit of a bit stream results in a loss of a considerable portion of the picture information and continuously affects the following frames. Accordingly, a severe deterioration in a picture quality results when a decoder decodes a bit stream with an error. To solve this problem, numerous methods for error concealment using neighboring information to restore the lost information has been proposed. Typical concealment methods include spatial prediction error concealment, temporal prediction error concealment, and error concealment using additional information.

The spatial prediction error concealing method compensates a lost picture block by an interpolation of the neighboring blocks in the spatial domain. An error concealment based on a projection is representative of a spatial prediction error concealment. The spatial prediction error concealment performs well if the lost block is small compared to the overall size of an image, but involves a great amount of calculation at the receiving terminal. Also, a loss may be linearly compensated up to a certain degree by a complicated algorithm, but a smoothing of a curved line or texture may result due to such compensation.

The temporal prediction error concealing method compensates a lost picture block using a motion vector in the time domain. Although this method is relatively simple and can quickly compensates a lost block, the accuracy of the compensated block is not high. The temporal prediction concealing method especially results in a low performance when there is a fast motion or irregular motion between two continuous frames.

Finally, error concealment methods using additional information inserts an additional information within the user data portion in anticipation of and to compensate an error if an error occurs. However, these methods also has drawbacks in that the amount of data increases due to the insertion of the additional information.

A temporal prediction error concealment method for a moving picture compression and decompression system in the related art will next be described with reference to FIG. 1.

In FIG. 1, a picture is divided into 16*16 macroblocks in conformation of most moving picture standards, where several macroblocks are consecutively damaged. A picture is processed in a unit of the macroblock and several macroblocks form a slice. Also, one frame includes several slices according to the size of the picture. According to the temporal prediction error concealment method, the damaged macroblocks E(n) within a current frame are substituted by macroblocks positioned at the same locations in a previous frame or are substituted by macroblocks of a previous frame using motion information of upper macroblocks MB(n) over the damaged macroblocks.

However, such error concealment methods have a drawback in that the substituted upper macroblock may have a low relationship with the damaged macroblock when a damaged macroblock is a macroblock having motion. On the other hand, when the upper macroblock has no motion, a wrong macroblock may be substituted for the damaged macroblock, resulting in a low efficiency.

SUMMARY OF THE INVENTION

Accordingly, an object of the present invention is to solve at least the problems and disadvantages of the related art.

An object of the present invention is to provide an efficient apparatus and method for concealing error in a moving picture decompression system.

Another object of the present invention is to provide an apparatus and method for concealing error in a moving picture decompression system which compensates a damaged macroblock by predicting motion vectors of the damaged macroblock utilizing motion information of both neighboring macroblocks such as a previous macroblock and an upper macroblock.

A further object of the present invention is to provide an apparatus and method for concealing error in a moving picture decompression system which compensates a damaged macroblock by predicting motion vectors of a damaged macroblock utilizing motion information of neighboring macroblocks, stores the predictive motion vectors, and adaptively uses the stored motion information for error concealment of subsequently damaged macroblocks.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for concealing error in moving picture decompression system includes a motion vector decoder; a macroblock reconstruction controller; a motion concealment unit for storing a predictive motion vector from the motion vector decoder depending on a control signal and an error_flag which are output from the macroblock reconstruction controller, and for compensating a damaged macroblock using a stored motion information of a previous macroblock; and a motion vector memory for storing the motion information depending on a signal from the motion concealment unit and for outputting the motion information of the previous macroblock to the motion concealment unit depending on the control signal.

In the above error concealment apparatus, the motion information is a motion information of an upper macroblock positioned immediately over the damaged macroblock and a motion information of a left macroblock positioned adjacent to the left side of the damaged macroblock. Also, the motion information is a macroblock type, a motion coding type, a motion vertical field select signal, and two motion vectors with respect to both a motion information of the upper macroblock and a motion information of the left macroblock.

The motion concealment unit of the error concealment apparatus according to the present invention includes a motion concealment controller for controlling the entire operation of the motion concealment unit depending on the control signal & error_flag output from the macroblock reconstruction controller; a prediction motion vector latch unit for latching macroblock parameters and motion vectors depending on a control signal of the motion concealment controller; a prediction motion vector decision unit for determining a predictive motion vector depending on the macroblock parameters latched by the prediction motion vector latch unit; a multiplexer for multiplexing predictive motion vectors or error concealment motion vectors into respective macroblock parameters and predictive motion vector data depending on whether the error_flag from the macroblock reconstruction controller exists; a macroblock parameter register unit for temporarily storing the macroblock parameters from the multiplexer according to picture coding parameters from the macroblock reconstruction controller; an address generating unit for generating macroblock addresses depending on signals of macroblock modes and motion types output from the macroblock parameter register unit and signal of pmv data output from the multiplexer according to the control signal of the motion concealment controller; an error concealment motion vector generating unit for converting current macroblock output from the multiplexer to bit streams depending on a control signal mvb_w_flag from the motion concealment controller unit, and storing the converted bit streams in the motion vector memory (MV_memory); a delay unit for delaying a motion information (ecmv data (n)) of the current macroblock from the error concealment motion vector generating unit for a predetermined time and outputting the motion information after the delay time; an error concealment motion vector latch unit for latching the previous macroblock stored in the motion vector memory depending on control signal output from the motion concealment controller; and an error concealment motion vector decision unit for determining error concealment motion vector depending on both signal output from the error concealment motion vector latch unit and a motion information of the previous macroblock delayed by the delay unit.

A method for concealing an error in a moving picture compression and decompression system according to the present invention includes: storing a motion information of a macroblock corresponding to a received signal; delaying the motion information by temporarily storing the motion information for a predetermined time; and performing an error concealment using the stored motion information and the delayed motion information when an error flag is input due to a generation of a damaged macroblock.

In the error concealment method, the storing step stores a picture coding type and a motion type of a macroblock that is currently decoded, and a motion information of an upper macroblock positioned immediately over the damaged macroblock and a motion information of a left macroblock positioned adjacent to the left side of the damaged macroblock, the motion information of the upper macroblock and the left macroblock being macroblock type, motion type, motion vertical field select, and motion vector. Also, the error concealment step conceals the error by substituting a macroblock adjacent to the damaged macroblock for the damaged macroblock using the motion information of the upper macroblock and the left macroblock. The error concealment step conceals the error depending on the picture coding type of the damaged macroblock.

More particularly, the error concealment step is performed using a macroblock at the same position within a previous frame when the picture coding type is an intra mode; by using the motion information of the upper macroblock over the damaged macroblock when the picture coding type is P-picture, B-picture or I-picture in which an error concealment motion vector is contained and when the upper macroblock type is different from the left macroblock type; by using the motion type when the upper macroblock type is the same with the left macroblock type. Namely, the error concealment step is executed using an average value of the two motion vectors of the two macroblocks when the upper macroblock type is the same with the left macroblock type, and using the motion vector of the upper macroblock when the upper macroblock type is different from the left macroblock type.

The error concealment apparatus and method in moving picture compression and decompression system according to the present invention stores motion information of a macroblock of a received signal, delays the motion information for a predetermined time, temporarily stores the motion information, and performs error concealment using the stored motion information and the delayed motion information when inputting error_flag depending on occurrence of the damaged macroblock. Thus, the motion vector of the damaged macroblock can be predicted more accurately without the necessity of additional hardwares, thereby enhancing visible effect of reconstructed picture under various error environments and providing excellent picture quality on measuring objective peak to peak signal noise to ratio.

BRIEF DESCRIPTION OF THE DRAWINGS

The invention will be described in detail with reference to the following drawings in which like reference numerals refer to like elements wherein:

FIG. 4 shows a memory map of the motion vector memory (MV_memory) of FIG. 3.

DETAILED DESCRIPTION OF THE PREFERRED EMBODIMENTS

Figure 1:
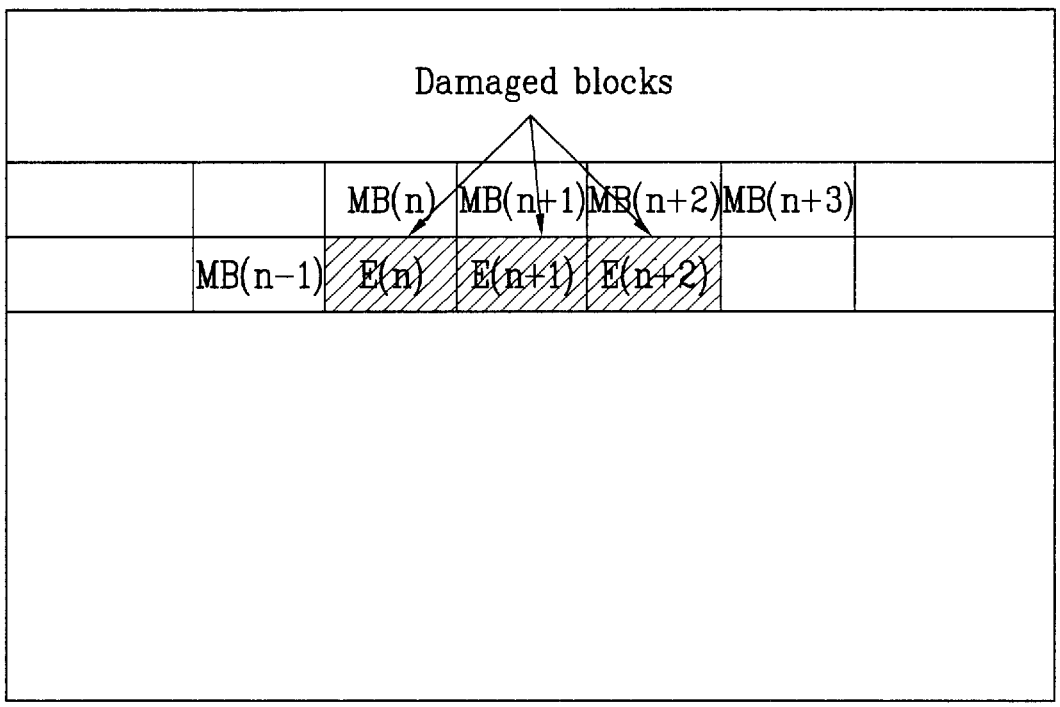
FIG. 1 is a diagram showing a temporal prediction error concealment method in the related art.
Figure 2:
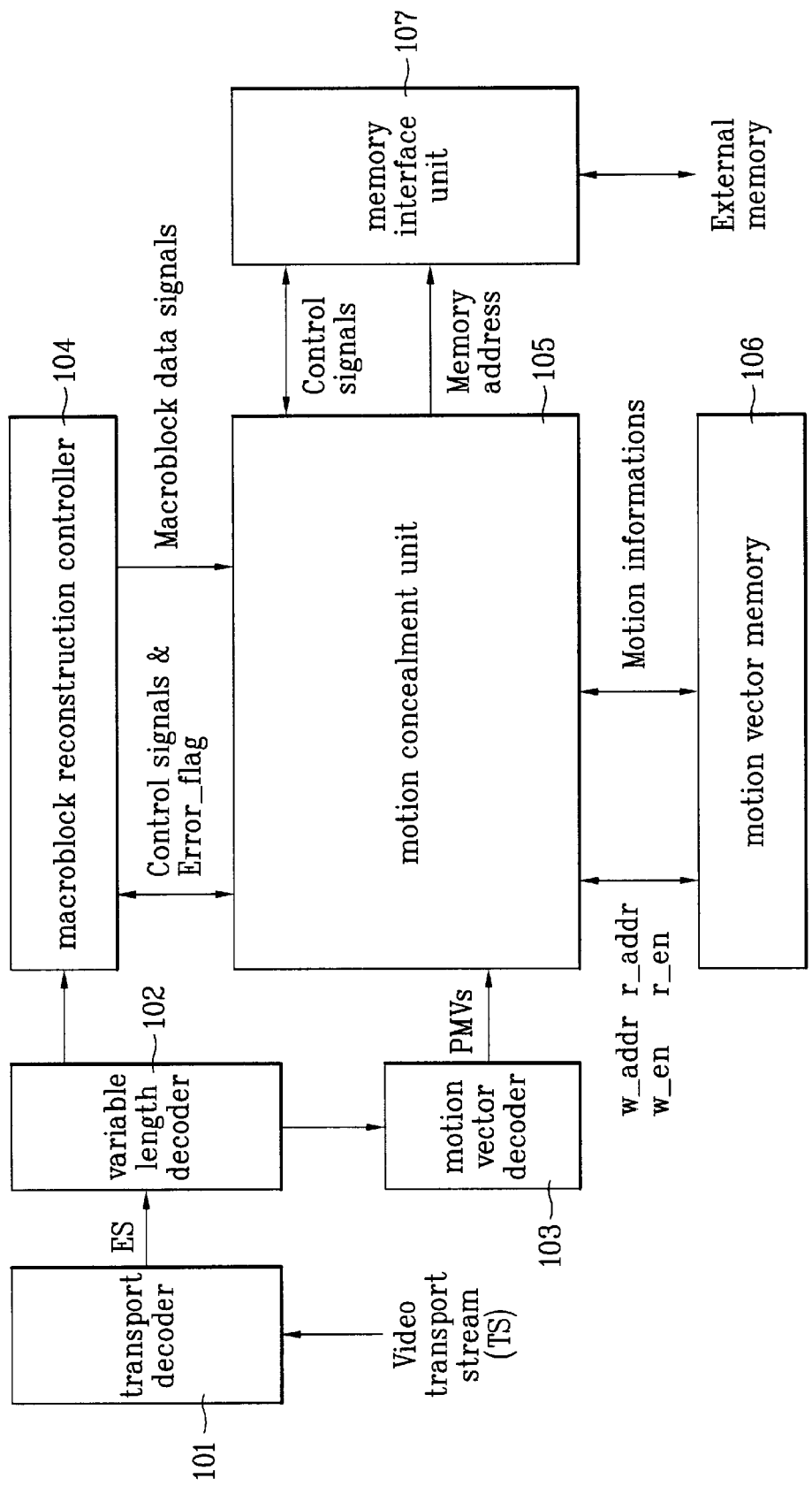
FIG. 2 is a block diagram of a motion error concealment apparatus in accordance with an embodiment of the present invention.

Reference will now be made in detail to the preferred embodiments of the present invention, examples of which are illustrated in the accompanying drawings. FIG. 2 is a block diagram of a motion error concealment apparatus in accordance with an embodiment of the present invention.

Referring to FIG. 2, the motion error concealment apparatus includes a transport decoder 101 which decodes input video transport stream to output an elementary stream ES; a variable length decoder (VLD) 102 which decodes the elementary stream ES such that the elementary stream ES has a variable length and when an error is generated, outputs the decoded elementary stream having a variable length together with an error_flag inserted in the decoded elementary stream ES; a motion vector decoder 103 which decodes a signal from the VLD 102 into a bit stream of predictive motion vectors (PMVs); a macroblock reconstruction controller 104 which outputs control signals & error_flag for concealing an error, and outputs macroblock data signals depending on an output signal of the VLD 102; a motion concealment unit 105 which obtains a stored motion information depending on the control signals & error_flag output from the macroblock reconstruction controller 104 and compensates a damaged macroblock using the obtained motion information; a motion vector memory (MV_memory) 106 which stores motion information depending on the signals output from the motion concealment unit 105; and a memory interface unit 107 which interfaces the motion vectors into an external memory depending on the control signals from the motion concealment unit 105 and a memory address signal.

Figure 3:
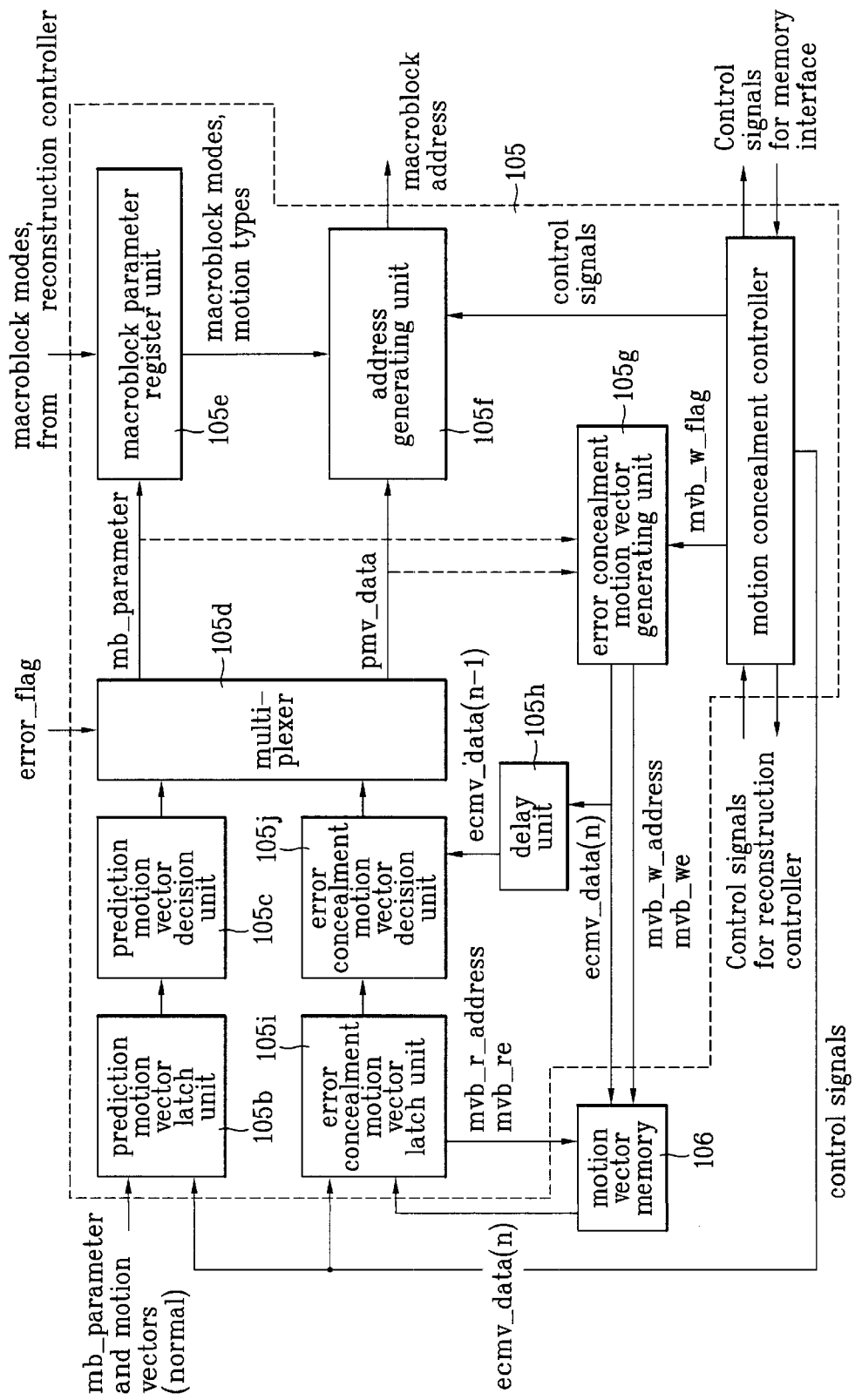
FIG. 3 is a block diagram of the motion concealment unit of FIG. 2.

FIG. 3 is a block diagram of the motion concealment unit 105, including a motion concealment controller 105a which controls the entire operation of the motion concealment unit 105 depending on the control signals & error_flag from the macroblock reconstruction controller 104; a predictive motion vector unit which determines a predictive motion vector of a current macroblock depending upon the macroblock data signals from the macroblock reconstruction controller 104 and upon motion vectors from the motion vector decoder 103; an error concealment motion vector unit which determines an error concealment motion vector; and a multiplexer (MUX) 105d which multiplexes either the predictive motion vector or the error concealment motion vector into macroblock parameters (mb_parameters) and predictive motion vector data (pmv_data), depending on whether an error_flag exists.

The error concealment unit 105 further includes a macroblock parameter register unit 105e which temporarily stores the mb_parameters from the MUX 105d according to the picture coding parameters from the macroblock reconstruction controller 104; an address generating unit 105f which generates macroblock addresses based upon signals of macroblock modes and motion types from the macroblock parameter register unit 105e and upon signal of pmv data from the MUX 105d, according to control signal of the motion concealment controller 105a; and an error concealment motion vector generating unit 105g which converts the current macroblock from the MUX 105d to bit streams of a predetermined format depending on control signal of mvb_w_flag from the motion concealment controller unit 105a, and stores the converted bit streams.

In the above error concealment unit 105, the prediction motion vector unit includes a prediction motion vector latch unit 105b which latches the macroblock data signals, namely the macroblock parameters, and motion vectors depending on control signals of the motion concealment controller 105a; and a prediction motion vector (PMV) decision unit 105c which determines a predictive motion vector depending on the mb_parameters latched and output by the prediction motion vector latch unit 105b, and depending on motion vectors.

Also, the error concealment motion vector unit includes a delay unit 105h which delays a motion information (ecmv_data(n)) of the current macroblock from the error concealment motion vector generating unit 105g for a predetermined time and outputs the motion information after an elapse of the delay time; an error concealment motion vector latch (ECMV latch) unit 105i which latches motion information corresponding to an upper macroblock over the current macroblock stored in the motion vector memory 106 depending on control signal output from the motion concealment controller unit 105a; and an error concealment motion vector decision (ECMV) unit 105j which determines error concealment motion vector depending on both signals output from the error concealment motion vector latch unit 105i and the previous macroblock (ecmv_data(n-1)) delayed and output by the delay unit 105h.

Figure 5:
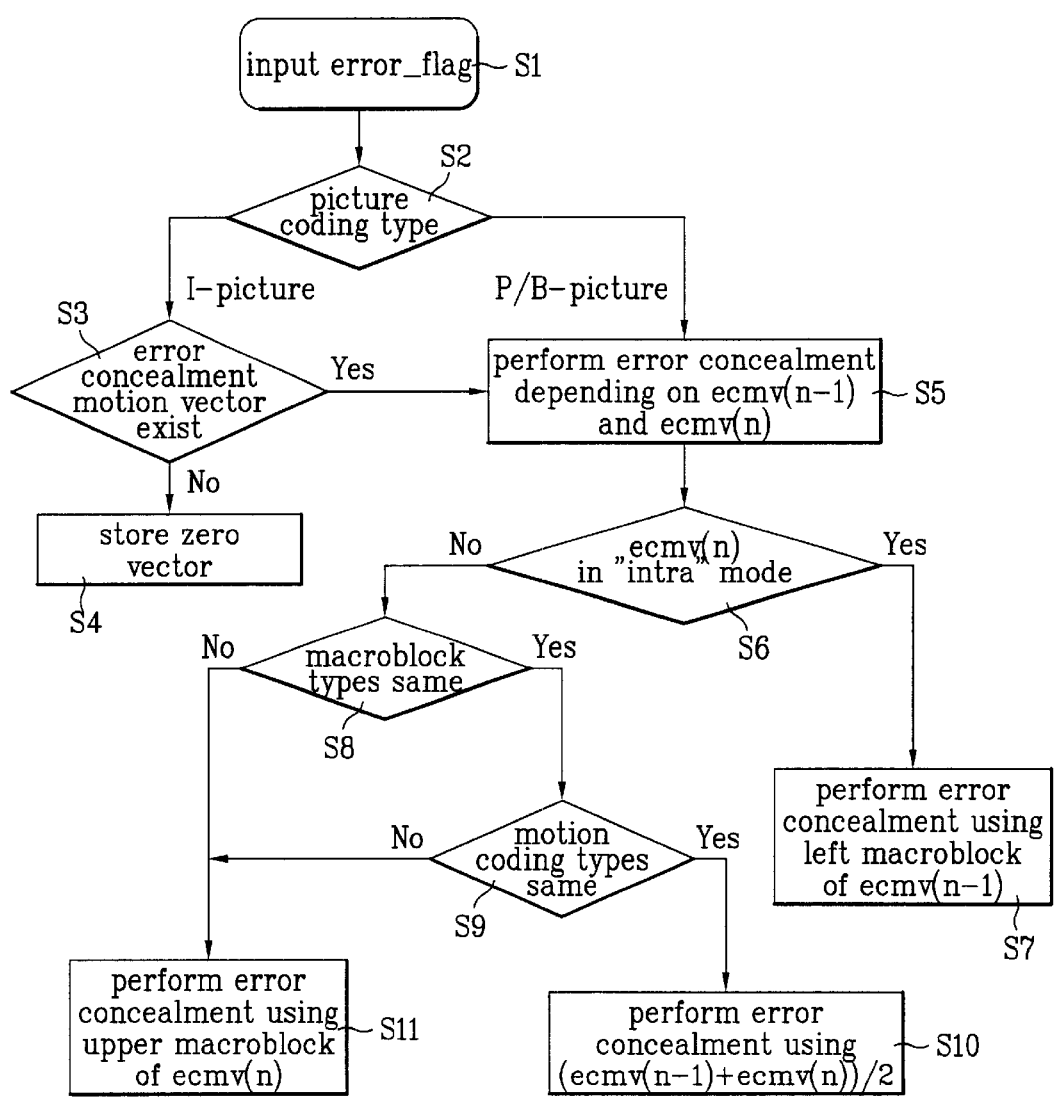
FIG. 5 is a flow chart showing error concealment method in moving picture compression and decompression system in accordance with the preferred embodiment of the present invention.

FIG. 4 is a schematic view showing memory map of the motion vector memory of FIG. 3 and FIG. 5 is a flow chart showing error concealment method in moving picture decompression system in accordance with a preferred embodiment of the present invention. The operation of the present invention will next be explained in detail with reference to the accompanying drawings.

Referring back to FIG. 2, when an error occurs after an input signal passes through a channel decoder, a transport error indicator signal is set to a predetermined value, for example to "1," and is added to the video transport stream. The video transport stream having the transport error indicator signal is then transmitted to the transport decoder 101.

The transport decoder 101 adds a sequence_error_start_code code to the transmitted video transport stream, to thereby output the ES. Afterwards, the VLD 102 decodes the ES from the transport decoder 101 into variable length codewords. If an error such as a syntax error or semantic error occurs in the video transport stream, the VLD 102 adds an error_flag to the variable length codewords and outputs the error_flag added variable length codewords.

The motion vector decoder 103 decodes signals from the VLD 102 and outputs predictive motion vectors (PMVs). Also, the macroblock reconstruction controller 104 inspects the signals from the VLD 102 to determine whether an error occurred, and outputs control signals & error_flag and macroblock data signals according to the determined results.

When the motion concealment unit 105 determines that an error did not occur, the motion concealment unit 105 converts the PMVs from the motion vector decoder 103 into bit stream of a predetermined format under the control of macroblock data signals from the macroblock reconstruction controller. Thus, the motion concealment unit 105 stores the motion information in the motion vector memory 106 as shown in FIG. 4. However, when the motion concealment unit 105 determines that an error did occur, an error concealment motion vector is obtained, converted, and stored in the motion vector memory 106.

As shown in FIG. 3, the motion concealment controller 105a of the motion concealment unit 105 controls the operations of the motion concealment unit 105 depending on control signals & error flag from the macroblock reconstruction controller 104. When an error_flag does not exist, the motion concealment controller 105a outputs a control signal for controlling the predictive motion vector latch unit 105b and the address generating unit 105f, and outputs a control signal (mvb_w_flag) for controlling the error concealment motion vector generating unit 105g such that the motion information from the motion vector decoder 103 is stored in the motion vector memory 106.

More particularly, the predictive motion vector latch unit 105b latches the mb_parameters from the macroblock reconstruction controller 104 and the motion vectors from the motion vector decoder 103 for a predetermined time period depending on a control signal from the motion concealment controller 105a, and outputs the latched signals to the predictive motion vector decision unit 105c. The predictive motion vector decision unit 105c determines a predictive motion vector of the current macroblock based upon the latched mb_parameters and motion vectors from the predictive motion vector latch unit 105b, and outputs the predictive motion vector signal to the MUX 105d.

Generally, the MUX 105d multiplexes one of either the predictive motion vector signal from the predict motion vector decision unit 105c or the error concealment motion vector signal, depending on whether an error_flag from the macroblock reconstruction controller 104 exists. If an error_flag does not exist, as in this case, the MUX 105d multiplexes the predictive motion vector signal into mb_parameters and predictive motion vector data (pmv_data). Thus, the mb_parameters are output to the macroblock parameter register unit 105e and the pmv_data is output to the address generating unit 105f.

The macroblock parameter register unit 105e temporarily stores the mb_parameters from the MUX 105d depending on the picture coding parameters from the macroblock reconstruction controller 104, and outputs macroblock modes and motion types to the address generating unit 105f. The address generating unit 105f generates macroblock addresses corresponding to the macroblock modes, motion types, and the pmv_data based upon the control signals from the motion concealment controller 105a.

Also, the MUX outputs the mb_parameters and pmv_data to the error concealment motion vector generating unit 105g. In response, the error concealment motion vector generating unit 105g converts the mb_parameters and pmv_data of the current macroblock into bit streams of a predetermined format, and stores the bit streams in the motion vector memory 106, according to the control signal mvb_w_flag from the motion concealment controller 105a.

For example, assuming that a High Definition TV signal of 1920*1080 has 120 macroblocks, two motion vectors (mv_1_x, mv_1_y, mv_2_x, mv_2_y), macroblock type (mbt), motion coding type (mct), and motion vertical field select (mvfs) are respectively stored as shown in FIG. 4.

In the preferred embodiment, the address of the motion vector memory 106 indicates the absolute address corresponding to a row of the current macroblock. Thus, in this case, the address would range from 0 to 119. Also, within the motion vector memory 106 indicated by the current macroblock addresses, a motion information of a macroblock would already be stored. Generally, the motion information would be for a macroblock corresponding to a previous row within the same frame and have a length of 50 bits.

The parameters of the current macroblocks would be stored in the motion vector memory 106, depending upon the picture coding type, macroblock modes, and motion types, as shown in Tables 1–3 below.

TABLE 1

| Picture coding type | Macroblock type(mbt) | Macroblock type in MV_memory |
|---|---|---|
| I-picture | Intra | Intra "00" |
|  | Intra_concealment mv | motion_forward "01" |
| P-picture | Intra | Intra "00" |
|  | motion_forward | motion_forward "01" |

TABLE 1-continued

| Picture coding type | Macroblock type(mbt) | Macroblock type in MV_memory |
|---|---|---|
|  | No MC | motion_forward "01" |
|  | Skip | motion_forward "01" |
| B-picture | Intra | Intra "00" |
|  | motion_forward | motion_forward "01" |
|  | motion_backward | motion_backward "10" |
|  | bi-directional | motion_forward "01" |
|  | Skip | previous macroblock type |

As shown in Table 1, macroblock type (mbt) can be one of an intra, a forward motion (motion_forward), or a backward motion (motion_backward) and is represented by 2 bits in the motion vector memory 106. When the picture coding type is a "P-picture" and the mbt is a "Skip" or a "No MC" code regulated in the MPEG-2 standard, the corresponding macroblock has a motion concealment vector with zero value. Thus, a forward motion mode is stored in the motion vector memory 106.

Also, when the picture coding type is a "B-picture" and the macroblock type is in a "bi-directional" mode, the motion vector memory 106 must store four motion vectors. However, in the preferred embodiment, only two motion vectors, namely two forward motion vectors (motion_forward), are stored in consideration of increasing the efficiency. Moreover, when the picture coding type is a B-picture and the macroblock type is in a "Skip" mode, the motion vector memory 106 maintains storage of the previous macroblock type.

TABLE 2

| Motion type | Motion type in MV_memory |
|---|---|
| MC_FIELD | "01" |
| MC_FRAME | "10" |
| MC_16*8 | "10" |
| MC_DMV | "11" |

TABLE 3

| First Macroblock | Second Macroblock | Motion vertical field select (mvfs) in MV_memory |
|---|---|---|
| top field | top field | "00" |
| top field | bottom field | "01" |
| bottom field | top field | "10" |
| bottom field | bottom field | "11" |

As shown in Table 2, the macroblock coding types (mct) is represented by 2 bits and has four modes of motion predictive types. When the mct is in a "MC_DMV" mode, which is a dual-prime predictive mode, three motion vectors (one predictive and two dual-prime) are necessary for a frame picture and two motion vectors (one predictive and one dual prime) are necessary for a field picture. To limit the motion vector memory, only two motion vectors are stored. Therefore, a dual-prime motion vector against the second MB is not stored for the frame picture mode, while motion vectors for the remaining motion modes are stored in two motion vector memories. The mvfs signal is represented by 2 bits and is used only for field-based predictions, i.e., for MC_FIELD and MC_16*8 modes.

Generally, the MPEG-2 standard regulates that the mvfs be composed of 4 bits, where 2 bits are used for the forward motion while the remaining 2 bits are used for the backward motion. This allows the use of mvfs signals in the bi-directional mode of a B-picture. However, since the present invention restricts the usage of a bi-directional mode to only forward motion mode, the mvfs need be used for one of either forward motion or backward motion.

Thus, the error concealment motion vector generating unit 105g stores the converted bit streams in the motion vector memory 106 in the format as described above. Furthermore, the delay unit 105h then delays a current macroblock (ecmv_data(n)) from the error concealment motion vector generating unit 105g for a selected time before outputting the delayed macroblock.

Thereafter, if an error_flag exists in the signal from the VLD 102, the macroblock reconstruction controller 104 outputs a signal informing the existence of the error_flag. Accordingly, the motion concealment unit 105 extracts motion information stored in the motion vector memory 106 based upon the error_flag from the macroblock reconstruction controller 104, performs an error concealment operation, determines error concealment motion vector, and outputs the error concealment motion vector.

Particularly, the motion concealment controller 105a outputs a control signal to perform an error concealment based upon the error_flag from the macroblock reconstruction controller 104. In response, the error concealment motion vector latch unit 105i latches the motion information (ecmv(n)) of a macroblock positioned over a damaged macroblock, i.e. the upper macroblock, among the motion information of the previous macroblocks stored in the motion vector memory 106. Here, the motion information of the upper macroblock is located using the address of the damaged macroblock (mvb_r_address). Thus, the latched motion information of the upper macroblock is output to the error concealment motion decision unit 105j.

The error concealment motion vector decision unit 105j determines an error concealment motion vector of the damaged macroblock based on the motion information (ecmv(n)) of the upper macroblock from the error concealment motion vector latch unit 105i and based upon the motion information (ecmv_data(n−1)) of the left macroblock delayed and output by the delay unit 105h after a predetermined time. The determined error concealment motion vector is output to the MUX 105d.

Referring to FIG. 5, the error concealment motion vector decision unit 105j inspects the picture coding type of the signal from the error concealment motion vector latch unit 105i, if an error flag exists (S1 and S2).

If the picture coding type is an I-picture, a determination is made as to whether an error concealment motion vector exists (S3). If an error concealment vector does not exist, the error concealment motion vector decision unit 105j stores a zero vector in the motion vector memory 106. (S4) The zero vector is the motion information of a macroblock at the same position of the damaged macroblock, but within a previous frame.

Otherwise, if the picture coding type is determined to be a P/B-picture or if an error concealment vector exists for an I-picture, the error concealment motion vector decision unit 105j performs an error concealment depending on ecmv(n) and ecmv(n−1), corresponding respectively to the motion information of the upper and left macroblocks of the damaged macroblock, already stored in the motion vector memory 106 (S5).

Particularly, the error concealment motion vector decision unit 105j determines whether the motion vector of the upper macroblock ecmv(n) is in the "Intra" mode (S6). If the motion vector ecmv(n) is in the "Intra" mode, the error concealment motion vector decision unit 105j performs error concealment using the motion vector of the left macroblock ecmv(n−1) (S7). Otherwise, the error concealment motion vector decision unit 105j further determines whether the macroblocks types of the upper, left and the error concealed macroblocks are the same (S8) 4.

When macroblock types are the same, the error concealment motion vector decision unit 105j determines whether the macroblock coding types are also same (S9). When the macroblock coding types are the same, the error concealment motion vector decision unit 105j averages the motion vector of the upper macroblock ecmv(n) and the motion vector of the left macroblock ecmv(n−1) to perform an error concealment (S10). Thus, the averaged vector is used to determine an error concealment motion vector. On the other hand, if the macroblock types are not the same or the macroblock coding types are not the same, the error concealment motion vector decision unit 105j performs error concealment using the upper macroblock ecmv(n) (S11).

The possible cases of the macroblock types and motion types with corresponding motion vectors to be used in the error concealment is shown in Tables 4 and 5 below.

TABLE 4

MB_types

| Upper MB mbt(n) | Left MB mbt(n−1) | EC MB mbt | Motion Vector |
|---|---|---|---|
| "00" | "00" | "00" | left MB |
| "00" | "01" | "01" | left MB |
| "00" | "10" | "10" | left MB |
| "01" | "00" | "01" | upper MB |
| "01" | "01" | "01" | Table 5 |
| "01" | "10" | "01" | upper MB |
| "10" | "00" | "10" | upper MB |
| "10" | "01" | "10" | upper MB |
| "10" | "10" | "10" | Table 5 |

TABLE 5

Motion types

| Upper MB mct(n) | Left MB mct(n−1) | EC MB mct | Motion Vector |
|---|---|---|---|
| "01" | "00" | "01" | average |
| "01" | "10" | "01" | upper MB |
| "01" | "11" | "01" | upper MB |
| "10" | "01" | "10" | upper MB |
| "10" | "10" | "10" | average |
| "10" | "11" | "10" | upper MB |
| "00" | "00" | "00" | upper MB |
| "01" | "01" | "01" | upper MB |
| "10" | "10" | "10" | average |

Since an error_flag does exist, the MUX 105d multiplexes the error concealment motion vector from the error concealment motion vector decision unit 105j into the mb_parameters and the pmv_data. As in the case when an error_flag does not exist, the mb_parameters are output to the macroblock parameter register unit 105e and the pmv_data is output to the address generating unit 105f.

Accordingly, the macroblock parameter register unit 105e outputs macroblock mode and motion type depending upon the mb_parameters from the MUX 105d. The address generating unit 105f then generates macroblock address corresponding to the pmv_data from the MUX 105d, and the macroblock mode and motion type from the macroblock parameter register unit 105e, depending on the control signal of the motion concealment controller 105a. In addition, the error concealment motion vector generating unit 105g, the error concealment motion vector latch unit 105i, and the error concealment motion vector decision unit 105j performs the above-described error concealment procedure until the error concealment is completed.

As a result, depending on a control signal of the motion concealment unit 105 or an external control signal, the memory interface unit 107 substitutes a damaged macroblock with a macroblock within a previous reference frame according to the memory address from the motion concealment unit 105.

Therefore, the error concealment is performed depending on the macroblock mode from the macroblock parameter register unit 105e. As shown in Table 1, in a motion_forward mode of an Intra mode, a damaged macroblock is substituted by a macroblock within a previous frame using the determined motion vector. On the other hand, in a motion_backward mode of an Intra mode, a damaged macroblock is substituted by a macroblock within subsequent frame using the determined motion vector.

As described previously, the error concealment apparatus and method in a moving picture decompression system according to the present invention predicts motion vector of a damaged macroblock using a previous macroblock and upper macroblock which are adjacent to the damaged macroblock when an error occurs. Thus, the damaged macroblock is compensated, the predicted motion information stored, and the stored motion information is adaptively used for error concealment of a subsequent damaged macroblock, thereby compensating for maintaining good picture quality at the receiving terminal against errors.

The foregoing embodiments are merely exemplary and are not to be construed as limiting the present invention. The present teachings can be readily applied to other types of apparatuses. The description of the present invention is intended to be illustrative, and not to limit the scope of the claims. May alternatives, modifications, and variations will be apparent to those skilled in the art.

What is claimed is:

1. An apparatus for concealing error in a moving picture decompression system comprising:
    a motion vector decoder, decoding an input bit stream from a variable length decoder into a bit stream of predictive motion vectors;
    a macroblock reconstruction controller receiving an input bit stream from said variable length decoder and outputting a plurality of control signals, an error_flag, and macroblock data signals based upon said input bit stream;
    a motion vector memory, storing motion information and outputting motion information of a previous macroblock, the stored motion information including both motion information of an upper macroblock positioned immediately over the damaged macroblock and motion information of a left macroblock positioned adjacent to the left side of the damaged macroblock; and
    a motion concealment unit, connected between the macroblock reconstruction controller and the motion vector memory, receiving and storing a predictive motion vector from the motion vector decoder and obtaining a portion of the stored motion information from the motion vector memory depending upon said plurality of control signals and said error_flag, and compensating a damaged macroblock using the obtained portion of the stored motion information, wherein the obtained portion of the stored motion information is one of either motion information of an upper macroblock positioned immediately over the damaged macroblock or motion information of a left macroblock positioned adjacent to the left of the damaged macroblock, and each of said obtained portion of the stored motion information includes a macroblock type, a motion coding type, a motion vertical field select signal, and at least two motion vectors.

2. The apparatus of claim 1, wherein the motion concealment unit comprises:
    a motion concealment controller controlling error concealment by outputting control signals, said motion concealment controller controlling the error concealment based upon said plurality of control signals and said error_flag, from the macroblock reconstruction controller;
    a predictive motion vector unit outputting a predictive motion vector of a current macroblock based upon the macroblock data signals from the macroblock reconstruction controller and the predictive motion vectors from the motion vector decoder;
    an error concealment motion vector unit determining and outputting an error concealment motion vector;
    a multiplexer multiplexing either the predictive motion vector of a current macroblock or the error concealment motion vector, depending on whether an error_flag exists, and outputting macroblock parameters and predictive motion vector data;
    a macroblock parameter register unit temporarily storing the macroblock parameters from the multiplexer according to picture coding parameters from the macroblock reconstruction controller;
    an address generating unit generating macroblock addresses based upon signals of macroblock modes and motion types from the macroblock parameter register unit and based upon the predictive motion vector data from the multiplexer, according to a first set of control signals from the motion concealment controller; and
    an error concealment motion vector generating unit, converting the macroblock parameters and the predictive motion vector data from the multiplexer into bit streams of a predetermined format depending on a second set of control signal from the motion concealment controller unit, and storing the converted bit streams.

3. The apparatus of claim 2, wherein the prediction motion vector unit includes:
    a prediction motion vector latch unit latching the macroblock parameters and the predictive motion vectors depending on a third set of control signals from the motion concealment controller; and
    a prediction motion vector decision unit, determining the predictive motion vector of a current macroblock depending upon the macroblock parameters and the predictive motion vectors latched and output by the prediction motion vector latch unit.

4. The apparatus of claim 2, wherein the error concealment motion vector unit includes:
    a delay unit delaying motion information of the current macroblock from the error concealment motion vector generating unit for a predetermined time and outputting the motion information after an elapse of the delay time;

an error concealment motion vector latch unit, latching motion information corresponding to an upper macroblock depending on a third set of control signal from the motion concealment controller unit; and an error concealment motion vector decision unit determining the error concealment motion vector depending on signals from both the error concealment motion vector latch unit and the previous macroblock delayed and output by the delay unit.

5. The apparatus of claim 4, further comprising a motion vector memory storing motion information according to the macroblock addresses generated by the address generating unit, and wherein the error concealment motion vector latch unit latches motion information from the motion vector memory.

6. The apparatus of claim 2, further comprising a motion vector memory storing motion information according to the macroblock addresses generated by the address generating unit.

7. The apparatus of claim 1, further comprising:

a transport decoder, decoding an input video transport stream to output an elementary stream, said, variable length decoder decoding the elementary stream such that the elementary stream has a variable length and when an error is generated, outputs the decoded elementary stream having a variable length together with an error_flag inserted in the decoded elementary stream;

a memory interface unit interfacing the motion vector into an external memory depending on the control signals and a memory address from the motion concealment unit.

8. A method for concealing an error in a moving picture decompression system comprising:

(a) storing motion information of a macroblock corresponding to a received signal, wherein the motion information includes a picture coding type and a motion type of a macroblock that is currently being decoded, the motion information of an upper macroblock positioned over the damaged macroblock, and the motion information of a left macroblock positioned adjacent the damage macroblock, the motion information of the upper macroblock and the left macroblock each including a macroblock type, a motion type, a motion vertical field select, and at least one motion vector;

(b) delaying the motion information by temporarily storing the motion information for a predetermined time; and (c) performing an error concealment using the motion information delayed in (b), when an error occurs due to generation of a damaged macroblock.

9. A method of claim 8, wherein in (c), error concealment is performed by substituting a damaged macroblock by an adjacent macroblock using the motion information of the upper macroblock and the left macroblock.

10. A method for concealing an error in a moving picture decompression system comprising:

(a) storing motion information of a macroblock corresponding to a received signal;

(b) delaying the motion information by temporarily storing the motion information for a predetermined time; and (c) performing an error concealment using the motion information delayed in (b), when an error occurs due to generation of a damaged macroblock, and concealing the error depending on a picture coding type of said damaged macroblock, wherein:

concealing the error using a zero vector if the picture coding type is an I-picture and if an error concealment vector does not exist;

otherwise using the motion information of the left macroblock if an error concealment vector exist and if the motion vector is in an Intra mode;

otherwise using the motion information of both the upper and left macroblocks if the macroblock types are the same and if the motion coding types are the same; and otherwise using the motion information of the upper macroblock.

11. The method of claim 10, wherein the motion information of both the upper and left macroblocks is an average of the motion information of both the upper and left macroblocks.

12. An apparatus for concealing error in a moving picture decompression system comprising:

a motion vector decoder, decoding an input bit stream into a bit stream of predictive motion vectors;

a macroblock reconstruction controller outputting a plurality of control signals, an error_flag, and macroblock data signals based upon said input bit stream; and a motion vector memory, storing motion information and outputting motion information of a previous macroblock, the stored motion information including both motion information of an upper macroblock positioned immediately over the damaged macroblock and motion information of a left macroblock positioned adjacent to the left side of the damaged macroblock; and a motion concealment unit, connected between the motion vector decoder and the macroblock reconstruction controller, obtaining a portion of the stored motion information depending upon said plurality of control signals and said error_flag, and compensating a damaged macroblock using the obtained portion of the stored motion information, wherein each of said obtained portion of the stored motion information includes a macroblock type, a motion coding type, a motion vertical field select signal, and at least two motion vectors.

13. An apparatus for concealing error in a moving picture decompression system comprising:

a motion vector decoder, decoding an input bit stream into a bit stream of predictive motion vectors;

a macroblock reconstruction controller outputting a plurality of control signals, an error_flag, and macroblock data signals based upon said input bit stream;

a motion vector memory, storing motion information and outputting motion information of a previous macroblock, the stored motion information including both motion information of an upper macroblock positioned immediately over the damaged macroblock and motion information of a left macroblock positioned adjacent to the left side of the damaged macroblock; and a motion concealment unit obtaining a portion of the stored motion information depending upon said plurality of control signals and said error_flag, and compensating a damaged macroblock using the obtained motion information, the motion concealment unit comprising:

a motion concealment controller controlling error concealment by outputting control signals, said motion concealment controller controlling the error concealment based upon said plurality of control signals and said error_flag from the macroblock reconstruction controller;

a predictive motion vector unit outputting a predictive motion vector of a current macroblock based upon the macroblock data signals from the macroblock reconstruction controller and the predictive motion vectors from the motion vector decoder;

an error concealment motion vector unit determining and outputting an error concealment motion vector;

a multiplexer multiplexing either the predictive motion vector of a current macroblock or the error concealment motion vector, depending on whether an error_flag exists, and outputs macroblock parameters and predictive motion vector data;

a macroblock parameter register unit temporarily storing the macroblock parameters from the MULTIPLEXER according to picture coding parameters from the macroblock reconstruction controller;

an address generating unit generating macroblock addresses based upon signals of macroblock modes and motion types from the macroblock parameters register unit and based upon the predictive motion vector data from the MULTIPLEXER, according to a first set of control signals from the motion concealment controller; and an error concealment motion vector generating unit, converting the macroblock parameters and the predictive motion vector data from the multiplexer into bit streams of a predetermined format depending on a second set of control signal from the motion concealment controller unit, and storing the converted bit streams.

14. The apparatus of claim 13, wherein the prediction motion vector unit includes:

a prediction motion vector latch unit, latching the macroblock parameters and the predictive motion vectors depending on a third set of control signals from the motion concealment controller; and a prediction motion vector decision unit, determining the predictive motion vector of a current macroblock depending upon the macroblock parameters and the predictive motion vectors latched and output by the prediction motion vector latch unit.

15. The apparatus of claim 13, wherein the error concealment motion vector unit includes:

a delay unit, delaying motion information of the current macroblock from the error concealment motion vector generating unit for a predetermined time and outputtings the motion information after an elapse of the delay time;

an error concealment motion vector latch unit, latching motion information corresponding to an upper macroblock depending on a third set of control signal from the motion concealment controller unit; and an error concealment motion vector decision unit, determining the error concealment motion vector depending on signals from both the error concealment motion vector latch unit and the previous macroblock delayed and output by the delay unit.

16. The apparatus of claim 15, further comprising a motion vector memory, storing motion information according to the macroblock addresses generated by the address generating unit, and wherein the error concealment motion vector latch unit latches motion information from the motion vector memory.

17. The apparatus of claim 13, further comprising a motion vector memory, storing motion information according to the macroblock addresses generated by the address generating unit.

18. An apparatus for concealing error in a moving picture decompression system comprising:

a transport decoder, decoding input video transport stream to output an elementary stream;

a variable length decoder, decoding the elementary stream such that the elementary stream has a variable length and when an error is generated, outputs the decoded elementary stream having a variable length together with an error_flag inserted in the decoded elementary stream to other units as an input bit stream;

a motion vector decoder decoding the input bit stream into a bit stream of predictive motion vectors;

a motion concealment unit, obtaining a portion stored motion information, said stored motion information including both motion information of an upper macroblock positioned immediately over the damaged macroblock and motion information of a left macroblock positioned adjacent to the left side of the damaged macroblock, depending upon a plurality of control signals and an error_flag and compensates a damaged macroblock using the obtained portion of the stored motion information;

a macroblock reconstruction controller outputting a plurality of control signals, an error_flag, and macroblock data signals to the motion concealment unit based upon said input bit stream;

a motion vector memory storing motion information depending on signals output from the motion concealment unit, said motion concealment unit being connected between the motion vector memory and the macroblock reconstruction controller; and a memory interface unit interfacing motion vectors into an external memory depending on control signals and a memory address from the motion concealment unit.

* * * * *